United States Patent [19]

Yamamoto

[11] Patent Number: 5,336,028
[45] Date of Patent: Aug. 9, 1994

[54] CAPTIVE SCREW ASSEMBLY

[75] Inventor: Albert K. Yamamoto, Huntington Beach, Calif.

[73] Assignee: VSI Corporation, Torrance, Calif.

[21] Appl. No.: 47,097

[22] Filed: Apr. 13, 1993

[51] Int. Cl.$^5$ .................. F16B 21/18; F16B 39/00
[52] U.S. Cl. ................... 411/107; 411/339; 411/353; 411/999; 403/406.1
[58] Field of Search ............... 411/105, 107, 112, 113, 411/183, 352, 353, 339, 999; 403/406.1, 408.1

[56] References Cited

U.S. PATENT DOCUMENTS

| | | |
|---|---|---|
| 2,018,346 | 10/1935 | Busby . |
| 2,958,070 | 10/1960 | Brewer et al. . |
| 3,465,803 | 9/1969 | Ernest et al. . |
| 3,777,358 | 12/1973 | Matievich et al. ............. 411/353 X |
| 3,843,080 | 10/1974 | Imai et al. . |
| 4,324,517 | 4/1982 | Dey . |
| 4,387,497 | 6/1983 | Gulistan .................. 411/105 X |
| 4,915,557 | 4/1990 | Stafford . |
| 4,934,888 | 6/1990 | Corsmeier et al. ............. 411/107 X |
| 5,037,259 | 8/1991 | Duran et al. ................. 411/183 X |

Primary Examiner—Neill R. Wilson
Attorney, Agent, or Firm—Pretty, Schroeder Brueggemann & Clark

[57] ABSTRACT

A captive screw assembly for mounting in flat panels of widely varying thicknesses. The assembly includes an inverted hollow cup with an outwardly extending flange on its lower edge to engage a back surface of the panel and is temporarily held in place by outwardly-projecting spring tabs. A lower portion of the cup extends through the thickness of an aperture in the panel, while center and upper portions of the cup extend above a front surface of the panel. A cylindrical sleeve is seated over the cup, and a threaded screw extends through the sleeve and the cup. When the screw engages a threaded nut, positioned below the back surface of the panel, the head of the screw urges an upper edge of the sleeve downwardly and causes a lower edge of the sleeve to bear against a ring positioned around the exterior of the cup. When the screw is completely tightened, the panel is gripped between the lower cup flange and the ring.

12 Claims, 2 Drawing Sheets

CAPTIVE SCREW ASSEMBLY

BACKGROUND OF THE INVENTION

1. Field of the Invention

This invention relates generally to screw fasteners, and, more particularly, to captive screw assemblies suitable for mounting in flat panels.

2. Description of the Prior Art

Captive screw assemblies are commonly used in the aerospace industry to secure removable panels to aircraft frames or assemblies, and to mount a variety of detachable devices on aircraft panels. Such assemblies are particularly well suited to applications in which the panel is repeatedly opened and closed for servicing or inspection, or in which components are alternatively mounted or dismounted on a panel.

The thin and fairly soft aluminum of most aircraft panels renders them generally unsuitable for repeated threading and unthreading of hardened screws. Consequently, steel housings typically are permanently affixed to an aircraft panel for mounting such screws. Once installed, these housings can retain the screws, even while a screw is not engaged in a threaded bore of a receiving nut. Accordingly, these screws are described as being "captive."

A typical screw housing is fitted into an aperture in a panel. To secure the housing in the panel, the diameter of the housing is matched to the diameter of the aperture and the length of the housing is appropriate to the thickness of the panel. However, because different aircraft panels have different thicknesses, the aircraft manufacturer or maintenance facility must stock a large and costly inventory of captive screws and their housings.

In addition, while captive screw assemblies are generally convenient and easy to use after they are installed, the initial installation of a captive screw assembly can be complex and time consuming. In many instances, the diameter of the panel aperture must be adapted to that of the screw housing, and the installation can require a series of operations on both sides of the panel. For example, a portion of the housing can be inserted from one side of the panel and fastened to the panel from the other side, in a two-step operation requiring an elaborate assembly tool or the cooperation of two assemblers.

Accordingly, there is a need for a captive screw assembly that is sized for a range of panel thicknesses, thereby reducing the variety and number of captive screw assemblies needed by an aircraft manufacturer or maintenance facility. Further, it should be appreciated that there is also a need for a captive screw assembly that can be installed in a variety of panels with minimal panel preparation. The present invention fulfills these needs.

SUMMARY OF THE INVENTION

The captive screw assembly of the present invention is suitable for mounting in Bat panels of widely varying thicknesses. In addition, the captive screw assembly can be installed easily and quickly, without requiring preparation of the panel beyond drilling an aperture of appropriate diameter. In one embodiment of the invention, the entire captive screw assembly can be inserted through the aperture and installed from one side of the panel.

The captive screw assembly of the present invention includes three components for securing the assembly in an aperture formed in an aircraft panel. First, an inverted, hollow cup with an outwardly projecting lower flange on its lower edge engages a back surface of the panel, while a lower portion of the cup extends through the thickness of the aperture. The cup is temporarily held in place in the panel by outwardly-projecting spring tabs extending from the lower portion. Center and upper portions of the cup extend above the front surface of the panel. Second, a generally cylindrical, hollow sleeve is seated over the cup. Third, a threaded screw extends through the sleeve and the cup, with its head bearing against an upper edge of the sleeve. When the screw engages the threaded bore of a nut positioned below the back surface of the panel, the screw's head is drawn downwardly against an upper edge of the sleeve, to cause a lower edge of the sleeve to bear against a ring positioned around the exterior of the cup and to urge the ring downwardly. When the nut and screw are completely tightened, the back surface of the panel is gripped from underneath by the cup's lower flange and the front surface of the panel is gripped from above by the ring.

In a more detailed feature of the present invention, the interior surface of the sleeve is dimensioned to mirror the exterior surface of the cup to provide a friction mount between the two. Accordingly, the sleeve includes a major portion with a central opening having a diameter substantially equal to the outer diameter of the cup's upper portion and it includes a minor portion with a central opening having a diameter substantially equal to the outer diameter of the cup's lower portion. Finally, the sleeve also includes a frustoconical shoulder that extends between its major portion and its minor portion, with the angle of the frustoconical sleeve's shoulder relative to the sleeve's longitudinal axis being substantially equal to the angle of the frustoconical cup's center portion relative to the cup's longitudinal axis.

Additional detailed features of the present invention include an inwardly-directed flange located on the cup's upper edge. A spring is also mounted around the screw shank between the upper flange and the screw head, to bias the screw head away from the cup. A more detailed embodiment of the ring includes an expandable ring that has a variable diameter. Before the sleeve is positioned over the cup, the ring is located in a contracted position in which it grips the cup's upper portion and in which its outer diameter is smaller than the diameter of the panel aperture. This configuration allows the cup and ring combination to be inserted through the panel from the back surface. As the screw head moves the sleeve downwardly over the cup, the sleeve's bottom edge urges the ring over the frustoconical cup's shoulder and onto the larger diameter lower portion of the cup. In this position, the ring's outer diameter is larger than the diameter of the panel aperture and the panel is thereby gripped by the cup's lower flange from below and by the ring from above.

Other aspects and advantages of the present invention will become apparent from the following description of the preferred embodiment, taken in conjunction with the accompanying drawings, which illustrate, by way of example, the principles of the invention.

DESCRIPTION OF THE PREFERRED EMBODIMENT

Figure 1:
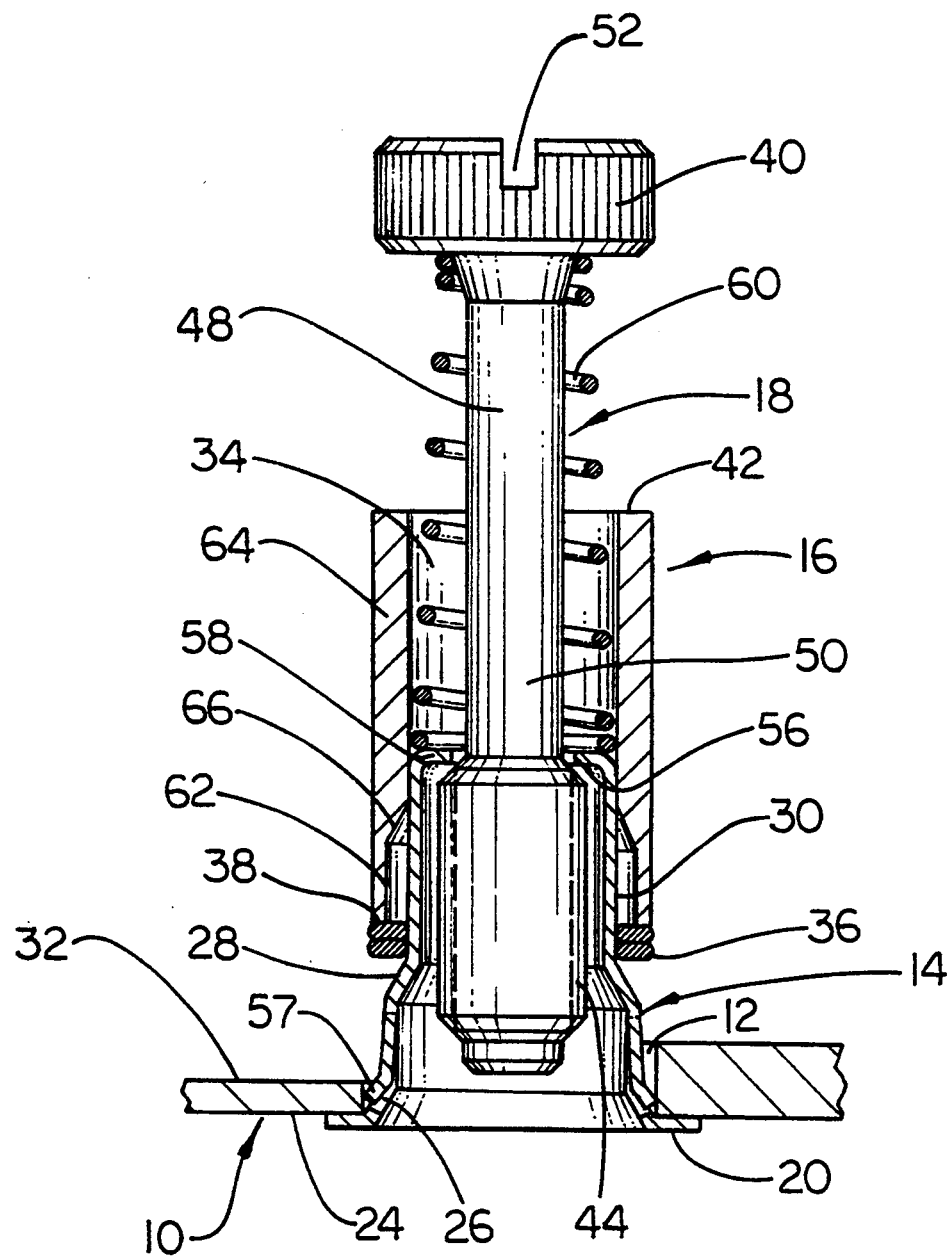
FIG. 1 is a cross-sectional view of a captive screw assembly embodying the invention, with its screw threaded through a central opening in a cup, prior to installation of the assembly on a panel.

With reference now to the illustrative drawings, and particularly to FIG. 1, there is shown a captive screw assembly that can be installed on an aircraft panel 10 by insertion through a panel aperture 12 for installation on the panel's front surface. The assembly includes three principle components, a cup 14, a sleeve 16 and a screw 18. The cup is generally inverted with a lower flange 20 extending outwardly from its lower edge. When the cup is inserted through the panel aperture, the lower flange engages a back surface 24 of the panel, while a lower portion 26 of the cup extends through the thickness of the aperture. A center portion 28 of the cup and an upper portion 30 of the cup extend above a front surface 32 of the panel.

The hollow sleeve 16 is generally cylindrical with a central opening 34. The interior surface of the sleeve's opening is dimensioned to mirror the exterior surface of the cup 14, to permit a friction mount between the two components when the sleeve is seated over the cup. Prior to installation, a ring or washer 36 is positioned around the cup's exterior surface, between the panel's front surface 32 and the sleeve's lower edge 38.

The screw 18 extends through the interiors of the sleeve 16 and the cup 14, with its head 40 bearing against the sleeve's upper edge 42. A threaded section 44 of the screw then engages a threaded nut or a threaded bore 46 positioned below the back surface 24 of the aircraft panel 10. As the screw threadedly engages the bore, the screw's head is drawn downwardly against the sleeve's upper edge to cause the sleeve to move downwardly over the cup and to cause the sleeve's lower edge to bear against the ring 36 until the ring abuts the panel's front surface 32. Accordingly, when the nut and screw are completely tightened, the panel is gripped from underneath by the cup's lower flange 20 and from above by the ring.

More particularly, the screw 18 includes the head 40 and a shaft 48, having the threaded section 44 and a shank section 50. The screw head has a slot 52 in the surface opposite the threaded section, for receiving a screwdriver or other driving means. When used in the captive screw assembly of the present invention, the screw shaft extends through a central opening 56 in the hollow cup 14. The annular lower flange 20 projects outwardly from the cup's lower edge. The lower flange's outer diameter is larger than the panel aperture's diameter, to allow the lower flange to bear against the panel's back surface 24 when the other components of the assembly have been inserted through the aperture.

The cylindrical wall of the cup 14 is divided into three portions, including the lower portion 26, the center portion 28, and the upper portion 30, described briefly above. The lower portion is connected to the lower flange 20, and it has an outer diameter sized to extend through the panel aperture 12. The lower portion includes two or more outwardly-projecting spring tabs 57 that temporarily hold the cup in the panel 10 during installation of the captive screw assembly. The cup's upper portion has a diameter smaller than the diameter of the lower portion, and it is connected to the lower portion by the center portion, which is frustoconical. The three portions are formed from a single piece of metal and have a common longitudinal axis. The upper portion also has an annular upper flange 58 projecting inwardly from its upper edge. The upper flange defines the cup's central opening 56, which is sized to threadedly engage the screw's threaded shank 44.

A coil spring 60 encircles the screw shaft 48 and is retained between the screw head 40 and the cup's upper flange 58 to bias the screw head away from the cup 14. In the preferred embodiment, the sleeve 16 and the ring 36 comprise a sleeve assembly that is sized to engage the cup's exterior surface and to grip the panel's front surface 32. The generally cylindrical sleeve 16 is divided into three portions, including a minor portion 62, a major portion 64 and a shoulder 66, all with central openings that together form the sleeve's central opening 34. The diameter of the minor portion's opening is substantially equal to the outer diameter of the cup's lower portion 26 and the diameter of the major portion's opening is substantially equal to the outer diameter of the cup's upper portion 30. Finally, the sleeve's shoulder is frustoconical and connects the minor portion to the major portion. The angle of the shoulder relative to the sleeve's longitudinal axis is substantially equal to the angle of the cup's center portion 28 relative to the cup's longitudinal axis. This configuration allows the sleeve's interior to fit snugly over the cup's exterior for a friction mount. Moreover, in the preferred embodiment, the sleeve's outer diameter is smaller than the diameter of the panel aperture 12, to allow the sleeve to be inserted through the panel aperture during installation.

Figure 2:
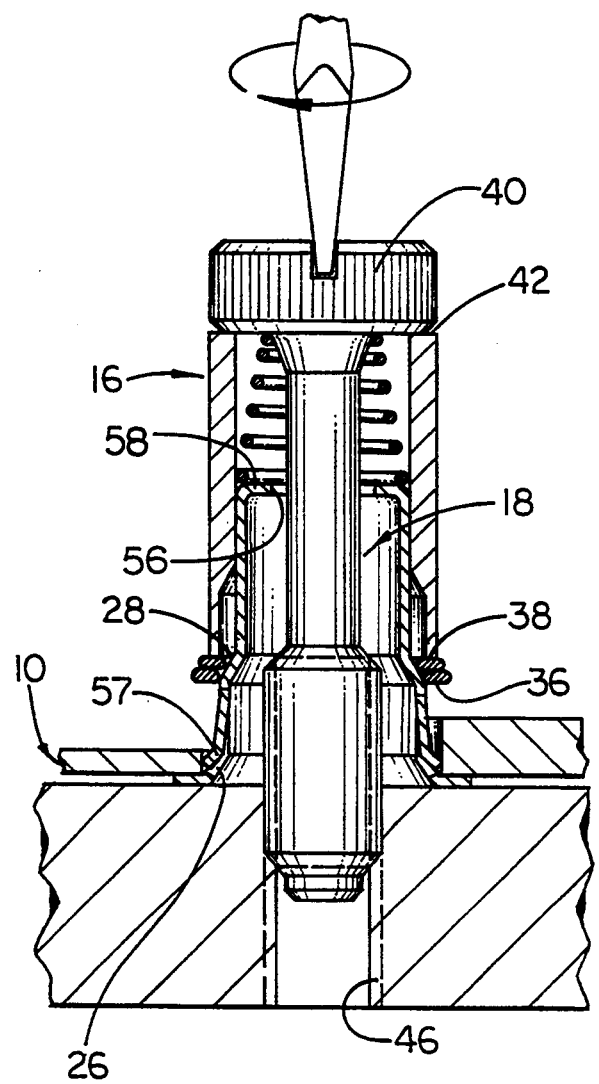
FIG. 2 is a cross-sectional view of the captive screw assembly of FIG. 1, with a ring being expanded over a frustoconical center portion of the cup by a downward movement of a sleeve.

The sleeve assembly also includes a lower portion. In the preferred embodiment, the lower portion is the expandable, slotted ring 36 that, prior to installation, encircles the cup's upper portion 30 below the sleeve's lower edge 38. When encircling the cup's upper portion, the ring's outer diameter is smaller than the diameter of the panel aperture 12. However, as shown in FIG. 2, when the screw 18 is threaded into the threaded bore 46, the screw head 40 urges the sleeve downwardly to cause the sleeve's lower edge to urge the ring downwardly on the cup. As the ring moves over the cup's frustoconical center portion 28 and onto the cup's lower portion 26, the ring expands and its outer diameter becomes larger than the diameter of the panel aperture.

When the outer diameters of the screw head 40, the sleeve 16 and the ring 36 are sized to be smaller than the diameter of the panel aperture 12, the captive screw assembly of the present invention may be inserted from the panel's back surface 24. First, the parts are loosely fitted together by: (a) mounting the ring around the cup's narrower upper portion 30; (b) placing the sleeve's major portion 64 over the cup's upper portion, above the ring; (c) encircling the coil spring 60 around the screw's shank section 50; and (d) threading the screw's threaded section 44 through the sleeve opening 34 and through the cup's threaded upper flange 58.

Next, the loosely fitted assembly can be mounted in the panel 10 by inserting the assembly, screw head 40 first, through the panel from the back side until the cup's lower flange 20 bears against the panel's back surface 24. The screw 18 is then threaded onto the threaded bore 46, located below the panel, and tightened. Initially, the screw head compresses the coil spring 60 and then the head bears against the sleeve's upper edge 42. From there, the screw head urges the sleeve downwardly and further in contact with the cup 14, while the sleeve's lower edge 38 urges the ring 36 downward until the ring is pressed against the panel's front surface. When the ring is mounted on the cup's lower portion 26, its outer diameter is larger than the diameter of the panel aperture. Therefore, the screw is tightened until the ring is firmly pressed between the sleeve and the panel. However, since the sleeve is now frictionally mounted on the cup, the pressure on the ring is maintained even if the screw is subsequently released.

Figure 3:
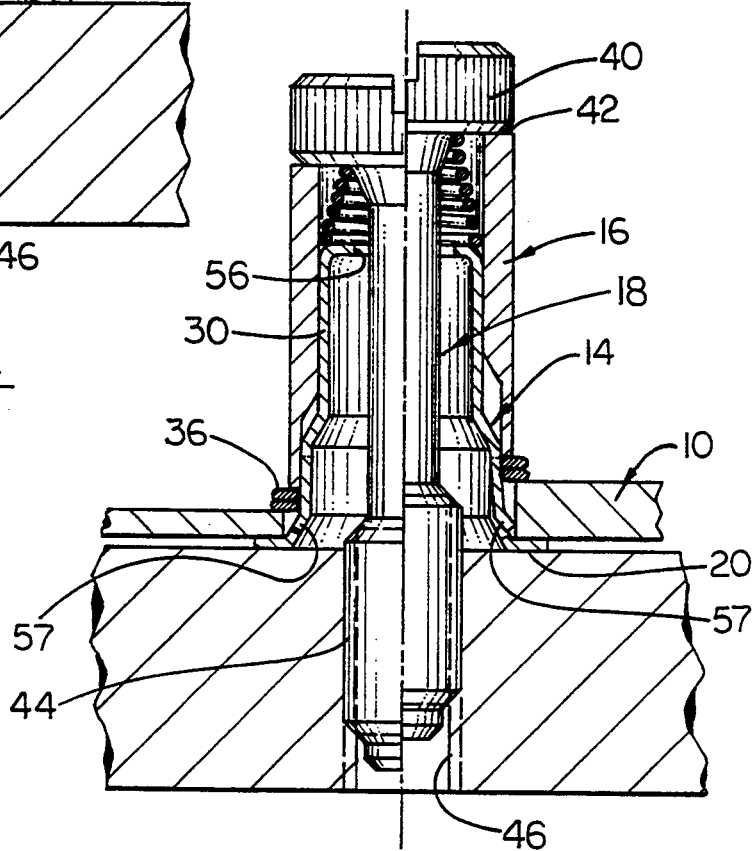
FIG. 3 is a split cross-sectional view of a captive screw assembly demonstrating a range of panel thicknesses to which the assembly of FIG. 1 can be attached.

As best shown in FIG. 3, since both the cup 14 and the sleeve 16 have lengthy portions in frictional contact with each another, the screw fastener assembly of the present invention can be used with a wide range of panel thicknesses because the sleeve is urged downwardly on the cup until the ring 36 presses against the panel 10. In this manner, the distance the sleeve is urged downwardly over the cup and the resulting distance between the ring and the cup's lower flange 20 is determined by the panel thickness. In another embodiment of the invention (not shown in the drawings), a rigid washer (non-expandable) with an outer diameter larger than the diameter of the aperture can be utilized in place of the ring 36. When installing this embodiment, the cup can be inserted from the panel's back side and then the washer is placed over the cup's upper portion 30 from the panel's front side. From there, steps (b) through (d), described above can be executed, and then the screw may be tightened into the threaded bore 46.

Although the present invention has been described in detail with reference to the presently preferred embodiment, it will be appreciated by those of ordinary skill in the art that various modifications can be made without departing from the invention. Accordingly, the invention is limited only by the following claims.

I claim:

1. A captive fastener assembly for use with a panel having a front surface, a back surface and an aperture extending therethrough and for use with a member having a threaded bore positioned below the panel back surface, the assembly comprising:
   a generally cylindrical cup adapted for insertion through the panel aperture, the cup having a central opening, a generally cylindrical wall with a lower edge, and a lower flange projecting outwardly from the lower edge and dimensioned to bear against the back surface of the panel;
   a sleeve assembly having a central opening, an interior surface sized to engage the exterior surface of the wall of the cup, and having a lower portion; and
   a screw having a threaded shank and a head, the screw shank extending through the central opening of the cup and the central opening of the sleeve assembly to threadedly engage the threaded bore positioned below the panel's back surface, the head of the screw urging the interior surface of the sleeve assembly to engage the exterior surface of the wall of the cup and urging the lower portion of the sleeve assembly toward the front surface of the panel, to secure the fastener assembly to the panel.

2. The fastener assembly of claim 1, wherein the sleeve assembly comprises:
   a sleeve having an interior surface sized to engage the exterior surface of the wall of the cup, and having a lower edge; and
   a ring sized to encircle the cup, and positioned to be gripped between the sleeve lower edge and the front surface of the panel when the interior surface of the sleeve engages the exterior surface of the cup.

3. The fastener assembly of claim 2, wherein:
   the cup wall has a lower portion with an outer diameter sized to extend through the panel aperture and connected to the lower flange, an upper portion with an outer diameter less than the outer diameter of the lower portion, and a frustoconical center portion connecting the lower portion to the upper portion;
   the lower portion includes an outwardly-projecting spring tab to temporarily hold the cup in the panel during installation of the fastener assembly;
   the ring is movable between a contracted position in which it grips the upper portion of the cup wall and an expanded position in which it grips the lower portion of the cup wall; and
   the outer diameter of the ring in the contracted position is smaller than the diameter of the panel aperture, and the outer diameter of the ring in the expanded position is larger than the diameter of the panel aperture.

4. The fastener assembly of claim 1, wherein:
   the cup further has an upper edge disposed at the end of the cup opposite the lower flange and an upper flange projecting inwardly from the upper edge; and
   a spring is mounted around the screw shank between the upper flange of the cup and the screw head to bias the screw head away from the cup.

5. The fastener assembly of claim 1, wherein the cup further comprises:
   an upper edge disposed at the end of the cup opposite the flange; and
   a threaded upper flange projecting inwardly from the upper edge of the cup and sized to engage the threaded screw shank.

6. The fastener assembly of claim 1, wherein:
   the cup wall has a lower portion with an outer diameter sized to extend through the panel aperture and connected to the lower flange, an upper portion with an outer diameter less than the outer diameter of the lower portion, and a frustoconical center portion connecting the lower portion to the upper portion; and
   the sleeve assembly includes a sleeve having a major portion, a minor portion and a frustoconical shoulder therebetween, the major portion having a central opening, and the minor portion having a central opening with a diameter larger than the diameter of the major portion central opening.

7. The fastener assembly of claim 6, wherein:
   the diameter of the central opening of the sleeve minor portion is substantially equal to the outer diameter of the lower portion of the cup;
   the diameter of the central opening of the sleeve major portion is substantially equal to the outer diameter of the upper portion of the cup; and
   the angle of the frustoconical sleeve shoulder relative to a longitudinal axis of the sleeve is substantially equal to the angle of the frustoconical cup center portion relative to a longitudinal axis of the cup.

8. The fastener assembly of claim 1, wherein the outer diameter of the screw head and the outer diameter of the sleeve assembly are sized to extend through the panel aperture.

9. A captive fastener assembly for use with a panel having a front surface, a back surface and an aperture extending therethrough and for use with a member having a threaded bore positioned below the panel back surface, the assembly comprising:

a generally cylindrical cup adapted for insertion through the panel aperture, the cup having a central opening, a generally cylindrical wall having a lower edge, a lower portion connected to the lower edge with an outer diameter sized to extend through the panel aperture, an upper portion with an exterior diameter less than the exterior diameter of the lower portion and with an upper edge disposed at the end of the upper portion opposite the lower edge, and a frustoconical center portion connecting the lower portion to the upper portion, a lower flange projecting outwardly from the lower edge of the wall and dimensioned to bear against the back surface of the panel, and a threaded upper flange projecting inwardly from the upper edge of the upper portion.

a sleeve having a lower edge, a central opening, an interior surface sized to engage the exterior surface of the cup;

a ring sized to encircle the cup, positioned to be gripped between the sleeve lower edge and the front surface of the panel when the interior surface of the sleeve engages the exterior surface of the cup, and moveable between a contracted position in which it grips the upper portion of the cup wall and in which its outer diameter is smaller than the diameter of the panel aperture, and an expanded position in which it grips the lower portion of the cup wall and in which its outer diameter is larger than the diameter of the panel aperture; and a screw having a head and a threaded shank that is dimensioned to engage the threaded upper flange, the screw shank extending through central opening of the cup and the central opening of the sleeve assembly to threadedly engage the threaded bore, the head of the screw urging the interior surface of the sleeve to engage the exterior surface of the cup wall, and the lower edge of the sleeve urging the ring against the front surface of the panel.

10. The fastener assembly of claim 9, wherein a spring is mounted around the screw shank between the upper flange of the cup and the screw head to bias the screw head away from the cup when the screw is not engaged with the threaded bore.

11. The fastener assembly of claim 9, wherein the sleeve includes:

a major portion with a central opening with a diameter substantially equal to the outer diameter of the upper portion of the cup;

a minor portion with a central opening having a diameter substantially equal to the outer diameter of the lower portion of the cup; and a frustoconical shoulder therebetween, the angle of the frustoconical sleeve shoulder relative to a longitudinal axis of the sleeve being substantially equal to the angle of the frustoconical cup center portion to a relative longitudinal axis of the cup.

12. The fastener assembly of claim 9, wherein the outer diameter of the screw head and the outer diameter of the sleeve are sized to extend through the panel aperture.

* * * * *